US007680896B2

(12) United States Patent
Torii

(10) Patent No.: US 7,680,896 B2
(45) Date of Patent: Mar. 16, 2010

(54) OBTAINING OR SENDING INFORMATION TO A DEVICE ON A NETWORK BY A CLIENT APPARATUS

(75) Inventor: Minoru Torii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1000 days.

(21) Appl. No.: 10/267,644

(22) Filed: Oct. 10, 2002

(65) Prior Publication Data

US 2003/0084113 A1     May 1, 2003

(30) Foreign Application Priority Data

Oct. 26, 2001    (JP)    ............................. 2001-329516

(51) Int. Cl.
    *G06F 15/16* (2006.01)
(52) U.S. Cl. .................. 709/208; 709/223; 709/224; 709/225; 709/226; 717/120; 717/121; 714/718
(58) Field of Classification Search ................ 709/223, 709/224, 225, 226, 23; 717/120, 121
See application file for complete search history.

(56) References Cited

U.S. PATENT DOCUMENTS

| 5,983,353 | A | * | 11/1999 | McHann, Jr. ................ 713/310 |
| 6,104,359 | A | * | 8/2000 | Endres et al. ............... 345/589 |
| 6,138,158 | A | * | 10/2000 | Boyle et al. ................. 709/225 |
| 6,243,738 | B1 | * | 6/2001 | Hayles et al. ............... 709/203 |
| 6,327,658 | B1 | | 12/2001 | Susaki |
| 6,446,192 | B1 | * | 9/2002 | Narasimhan et al. .......... 712/29 |
| 6,510,236 | B1 | * | 1/2003 | Crane et al. ................. 382/116 |
| 6,674,548 | B1 | * | 1/2004 | Kanemitsu ................... 358/401 |
| 6,928,477 | B1 | * | 8/2005 | Leymann et al. ............ 709/226 |
| 7,165,109 | B2 | * | 1/2007 | Chiloyan et al. ............ 709/227 |
| 2001/0056464 | A1 | * | 12/2001 | Ishihara et al. .............. 709/203 |
| 2002/0147006 | A1 | * | 10/2002 | Coon et al. ................. 455/420 |

FOREIGN PATENT DOCUMENTS

| JP | 6-67907 | 3/1994 |
| JP | 11-143840 | 5/1999 |
| JP | 2001-282656 | 10/2001 |

* cited by examiner

*Primary Examiner*—Saleh Najjar
*Assistant Examiner*—Thuong T Nguyen
(74) *Attorney, Agent, or Firm*—Fitzpatrick, Cella, Harper & Scinto

(57) ABSTRACT

A system in which even in the case where an arbitrary client computer downloads or uploads a large amount of data to/from a device on a network, no influence is exerted on device management which is being executed by another client computer is provided.

8 Claims, 9 Drawing Sheets

OBTAINING OR SENDING INFORMATION TO A DEVICE ON A NETWORK BY A CLIENT APPARATUS

BACKGROUND OF THE INVENTION

1. Field of the Invention

The invention relates to a device management apparatus and a device management method which are used in, for example, an apparatus or a system for managing devices connected onto a network. The invention also relates to a computer-readable memory medium in which a program for embodying those device management apparatus and method has been stored and to such a program.

2. Related Background Art

Hitherto, as a method of managing, for example, devices on a network, there is a method according to an SNMP (Simple Network Management Protocol)/an MIB (Management Information Base).

The SNMP is a protocol for constructing a network management system on a TCP/IP network. The MIB is a virtual database in which management information has been numbered and arranged onto a tree so that management software (manager) can efficiently search and set the management information.

According to a network device management technique by the SNMP/MIB, since at least one network management station (NMS), several management target nodes (management target devices; hereinafter, referred to as "devices" or "nodes") each including an agent, and a network management protocol which is used when the management station or the agent exchanges management information are included in the network management system, the user can obtain data on the network or change the data by communicating with agent software on the management target node by using software for management of the network devices on the NMS.

As a method of managing the devices on the network, in addition to the method by the SNMP/MIB mentioned above, for example, in the case of downloading/uploading a large amount of data, there is a method according to an FTP protocol or the like using a connection type protocol (TCP or the like).

SUMMARY OF THE INVENTION

In the case where the software for managing the network devices as mentioned above is used in a distribution environment (environment in which terminal apparatuses which can activate this software are distributed and installed), it is a general way to use a construction based on a server application (application which operates in the terminal apparatus on the server side) having a network managing function and a plurality of client applications (applications which operate in the terminal apparatuses on the client side) as GUI portions which are activated in each terminal apparatus.

However, the conventional network device management method as mentioned above has problems such that in the case where a plurality of clients whose client applications are activated exist and a certain specific client downloads or uploads a large amount of data into/from a device such as a printer or the like on a network via a server, a burden of communication of the large amount of data is applied to the server, so that communication performance between another client and the server is deteriorated and an influence is exerted on device management or the like which is performed by the client, and the like.

The invention is, therefore, made to solve the above drawbacks and it is an object of the invention that even in the case where an arbitrary client downloads or uploads a large amount of data into/from a device on a network, by constructing so as not to influence device management which is performed by another client, all clients can always execute the device management in a preferable state.

For this purpose, according to the invention, a device control process for obtaining or setting information of devices and a managing process for managing a plurality of device processes which are being executed are executed, and the device control process corresponding to the device is activated in accordance with a fact that a control instruction for controlling the device is received from an outside.

DETAILED DESCRIPTION OF THE PREFERRED EMBODIMENT

An embodiment of the invention will be described hereinbelow with reference to the drawings.

Figure 1:
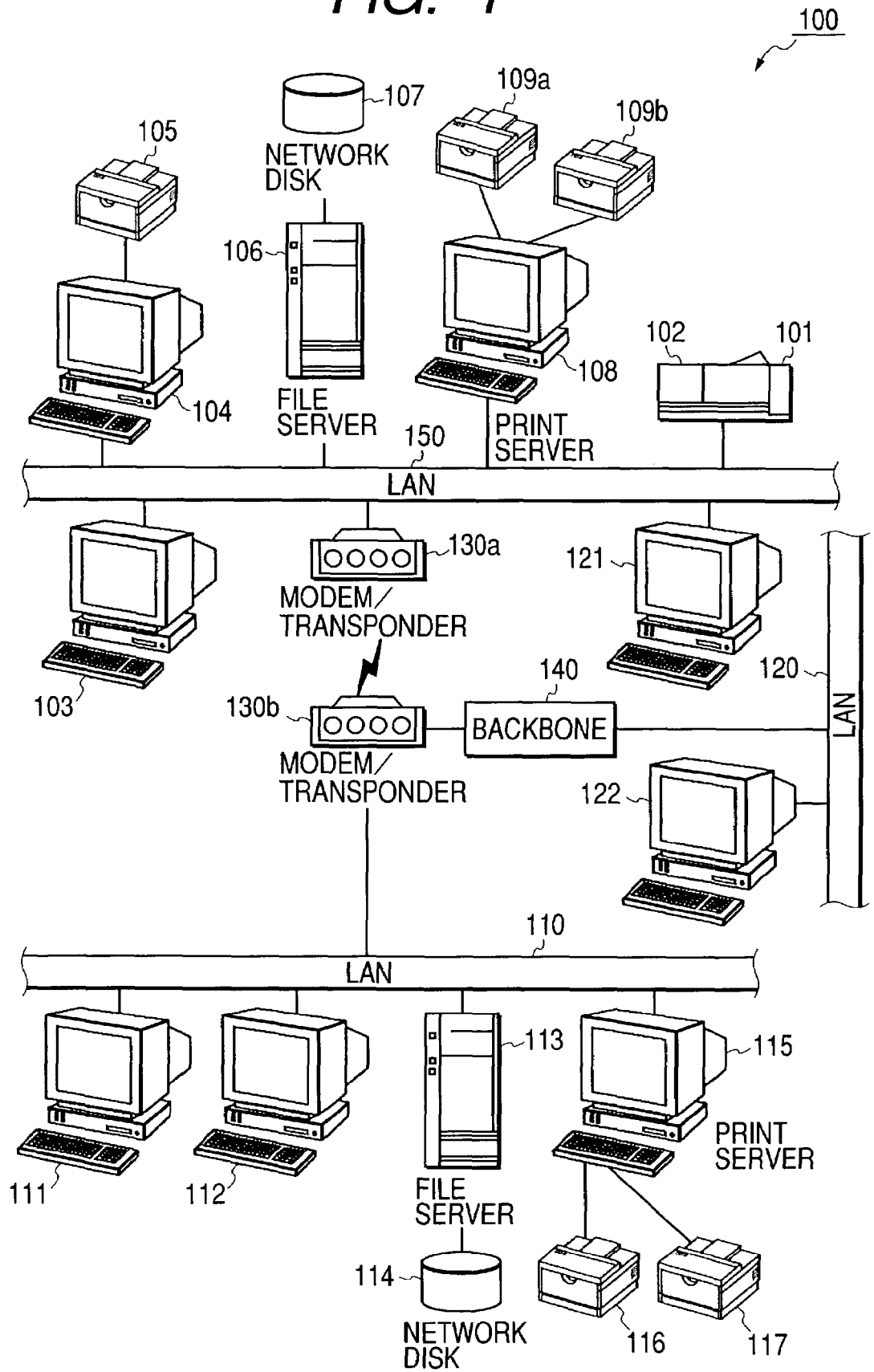
FIG. 1 is a block diagram showing a construction of a network system to which the invention is applied.

The invention is applied to, for example, a network system 100 as shown in FIG. 1.

A construction and the operation of the network system 100 in the embodiment will be specifically explained hereinbelow.

<Whole Construction and Operation of the Network System 100>

The network system 100 is a system of a distribution network environment and has a construction including various devices connected onto local area networks (LANs) 150, 120, and 110 as shown in FIG. 1.

The following component elements are connected to the LAN 150: that is, personal computers (hereinafter, simply referred to as "PCs") 103 and 121; a PC 104 to which a printer 105 is connected; a file server 106 to which a network disk 107 is connected; a print server 108 to which printers 109a and 109b are connected; a printer 102 having a network board 101; and a modem (modulator/demodulator)/transponder 130a for connecting to the networks 120 and 110 via a WAN.

A PC 122 and a backbone 140 to which a modem/transponder 130b having a construction similar to that of the modem/transponder 130a are connected to the LAN 120.

PCs 111 and 112, a file server 113 to which a network disk 114 is connected, and a print server 115 to which printers 116 and 117 are connected are connected to the LAN 110.

Figure 2:
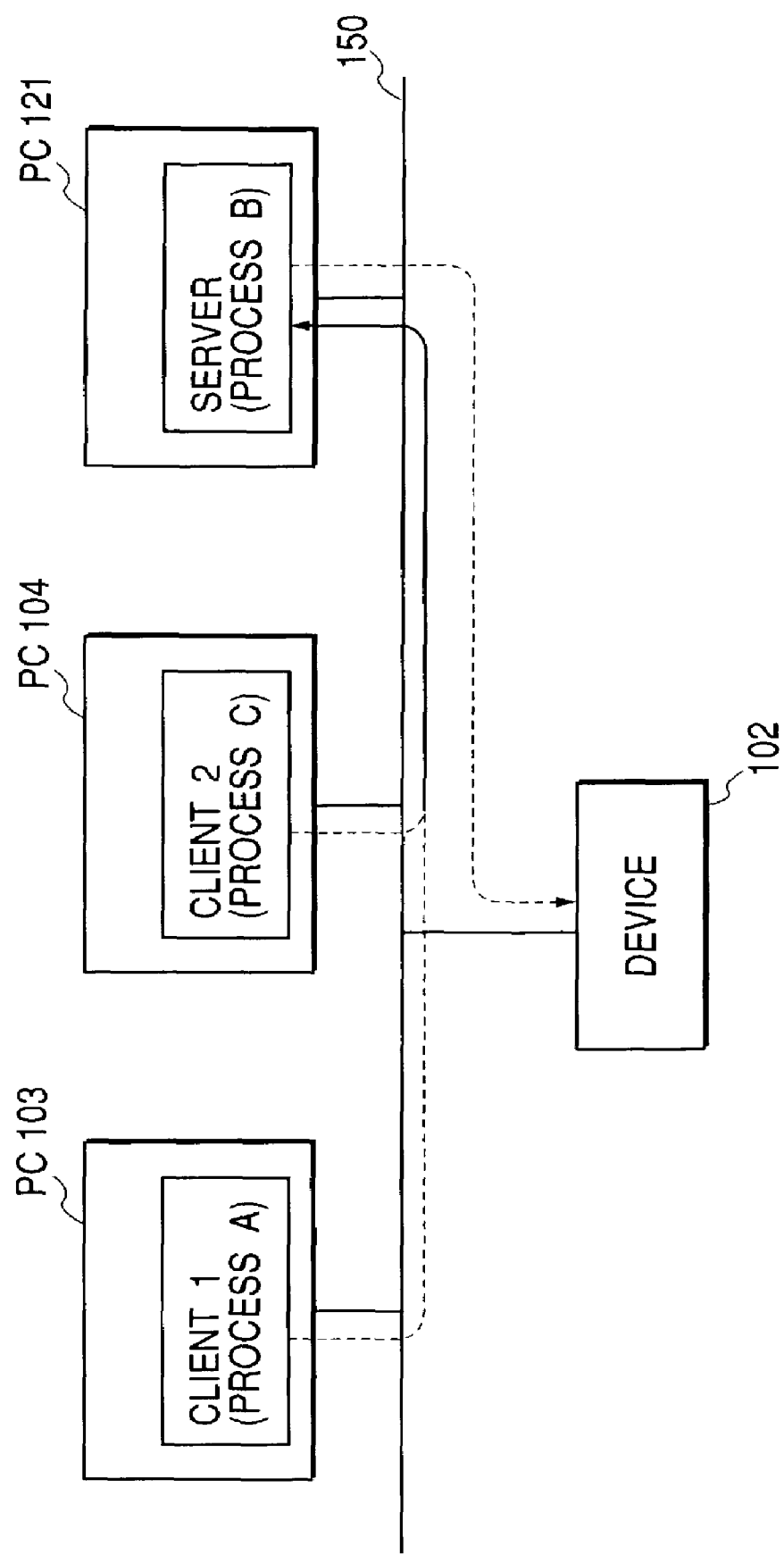
FIG. 2 is a diagram for explaining a relation between terminal apparatuses in which client applications operate and a terminal apparatus in which a server application operates in the network system.

FIG. 2 shows an example of a construction in the case where attention is paid to, for example, the PCs 103, 104, and 121 and the printer 102 in the network system 100 (refer to FIG. 1) shown in FIG. 1.

In the PC 103, a process A of a client application 1 is activated. In the PC 104, a process C of a client application 2 is activated. In the PC 121, a process B of a server application is activated. By such a construction, the printer 102 in which an SNMP agent has been installed is managed.

The client applications 1 and 2 communicate with the server application by a function of communication between the processes (hereinafter, referred to as an inter-process communication). The server application communicates with the printer 102 as a device by an SNMP protocol or the like.

With respect to the standard for making the inter-process communication, an RPC (Remote Procedure Call) has been defined by an RFC (Request For Comments) 1057.

The RPC is a method whereby a terminal apparatus (hereinafter, simply referred to as "server") on the server side prepares a function group for providing network services and another terminal apparatus (apparatus on the client side; hereinafter, simply referred to as "client") on the network can call such a function group in a manner similar to functions in a local machine.

A flow of the inter-process communication in the RPC is as follows.

First, the client calls an RPC function prepared in the server as a service request to the server. At this point of time, a data packet in which call information of the RPC function has been stored is sent to the server and a main program which is being executed in the client is interrupted.

When the data packet is received from the client, the server dispatches the RPC function shown by the data packet and called by the client, extracts an argument of the RPC function, thereafter, executes a service on the basis of the argument, and returns a result of the execution to the client.

When the result of the service execution from the server is received, the client restarts to execute the main program.

Generally, the server in which the server application having the network managing function is activated is constructed in a manner such that one server is arranged onto the network (distributed network) and has a plurality of instances in the server applications, thereby managing a plurality of devices on the network.

The client in which the client application is activated exists and operates as a plurality of different terminal apparatuses. By accessing the server by the inter-process communication mentioned above, the client can perform obtainment, setting, and the like of information regarding the devices on the network.

For example, in the case where the PC 103 in which the client application 1 is activated obtains information (device information) of the printer 102, in the PC 103, the client application 1 makes the inter-process communication using a proxy, thereby transmitting information indicative of a device (printer 102 here) in which the user wants to obtain the information to the PC 121 in which the server application is activated.

In the PC 121, the server application receives the information transmitted from the client application 1 by a stub, recognizes the device (printer 102) whose information should be obtained by the received information, obtains the device information of the printer 102 by the SNMP protocol or the like, and returns (callback notification) the obtained information to the PC 103 in which the client application 1 is activated via the proxy by the inter-process communication.

In the PC 103 which received this notification, the client application 1 performs a bit map display or the like on the basis of the notification information, thereby displaying the device information to the user of the PC 103.

For example, when the PC 103 in which the client application 1 is activated sets information into the printer 102, in the PC 103, the client application 1 transmits information (device information) which desires the setting to the PC 121 in which the server application is activated by the inter-process communication using the proxy.

In the PC 121, the server application receives the information transmitted from the client application 1 by the stub and sets the device information by the SNMP protocol or the like into the information setting target device (printer 102) shown by the received information. By the server application, the PC 103 in which the client application 1 is activated via the proxy by the inter-process communication is callback notified of information showing success or failure of the above setting operation from the stub.

In the PC 103, by performing the bit map display or the like on the basis of the callback notification information from the server application, the client application 1 displays the set information to the device to the user of the PC 103.

<Characteristic Construction and Operation of the Network System 100>

The network system 100 has a network device managing function. This network device managing function is constructed in a manner such that it operates in parallel, particularly, in the terminal apparatuses (PCs or the like shown in FIG. 1) existing in the network system 100 in a distribution network environment and data can be independently handled every device and a load can be distributed by means for activating the corresponding process every device such as PC, printer, or the like shown in FIG. 1.

Figure 3:
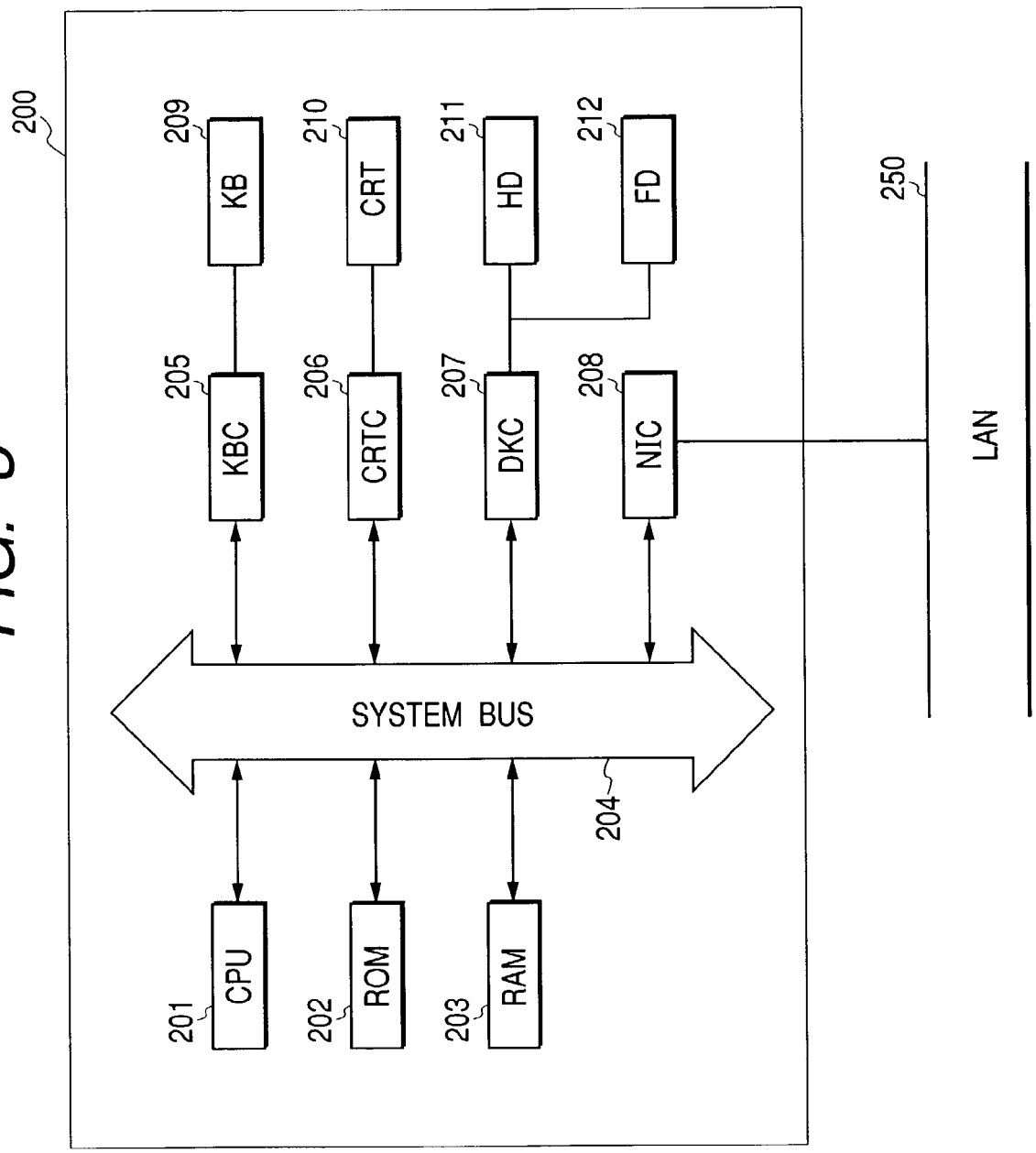
FIG. 3 is a block diagram showing a construction of a device management apparatus of the network system.

FIG. 3 shows a construction of a PC 200 (hereinafter, also referred to as a "network management apparatus 200") which is provided with the network device managing function.

As shown in FIG. 3, the network management apparatus 200 is constructed in a manner such that a CPU 201, an ROM 202, an RAM 203, a keyboard controller (KBC) 205 of a keyboard (KB) 209, a CRT controller (CRTC) 206 of a CRT display (CRT) 210 serving as a display unit, a disk controller (DKC) 207 of a hard disk (HD) 211 and a flexible disk (FD) 212, and a network interface controller (NIC) 208 for connecting to a network 250 corresponding to the LANs 150, 120, and 110 shown in FIG. 1 are connected via a system bus 204 so that they can communicate with each other.

The CPU 201 executes software stored in the ROM 202 or HD 211 or software which is supplied from the FD 212, thereby unitarily controlling each of the component elements connected to the system bus 204.

The CPU 201 reads out a processing program according to a predetermined processing sequence from the ROM 202, HD 211, or FD 212 and executes it, thereby making control for realizing the operation in the embodiment.

The RAM 203 functions as a main memory, a work area, or the like of the CPU 201.

The KBC 205 controls an instruction input from the KB 209, a pointing device (not shown), or the like.

The CRTC 206 controls a display of the CRT 210.

The DKC 207 controls accesses to the HD 211 and FD 212 for storing a boot program, various applications, an edit file, a user file, a network management program, a predetermined processing program in the embodiment, and the like.

The NIC 208 bidirectionally transmits and receives data to/from the apparatuses on the network 250 or the system.

In the embodiment, for example, a program of software for network device management according to the embodiment and serving as a main part of the operation in the following whole explanation is stored, for example, onto the hard disk (HD) 211. In the following whole explanation, a main part of the execution is the CPU 201 on hardware unless otherwise particularly specified. A main part of the control on the software is network management software stored on the hard disk (HD) 211.

The network device management program in the embodiment can be also constructed so as to be supplied, for example, in a form such that it has been stored in a memory medium such as FD 211, CD-ROM, or the like. In this case, the network management program is read out from the memory medium by the DKC 207 as an FD controller (FD), a CD-ROM drive (not shown), or the like and installed onto the hard disk (HD) 211.

Figure 4:
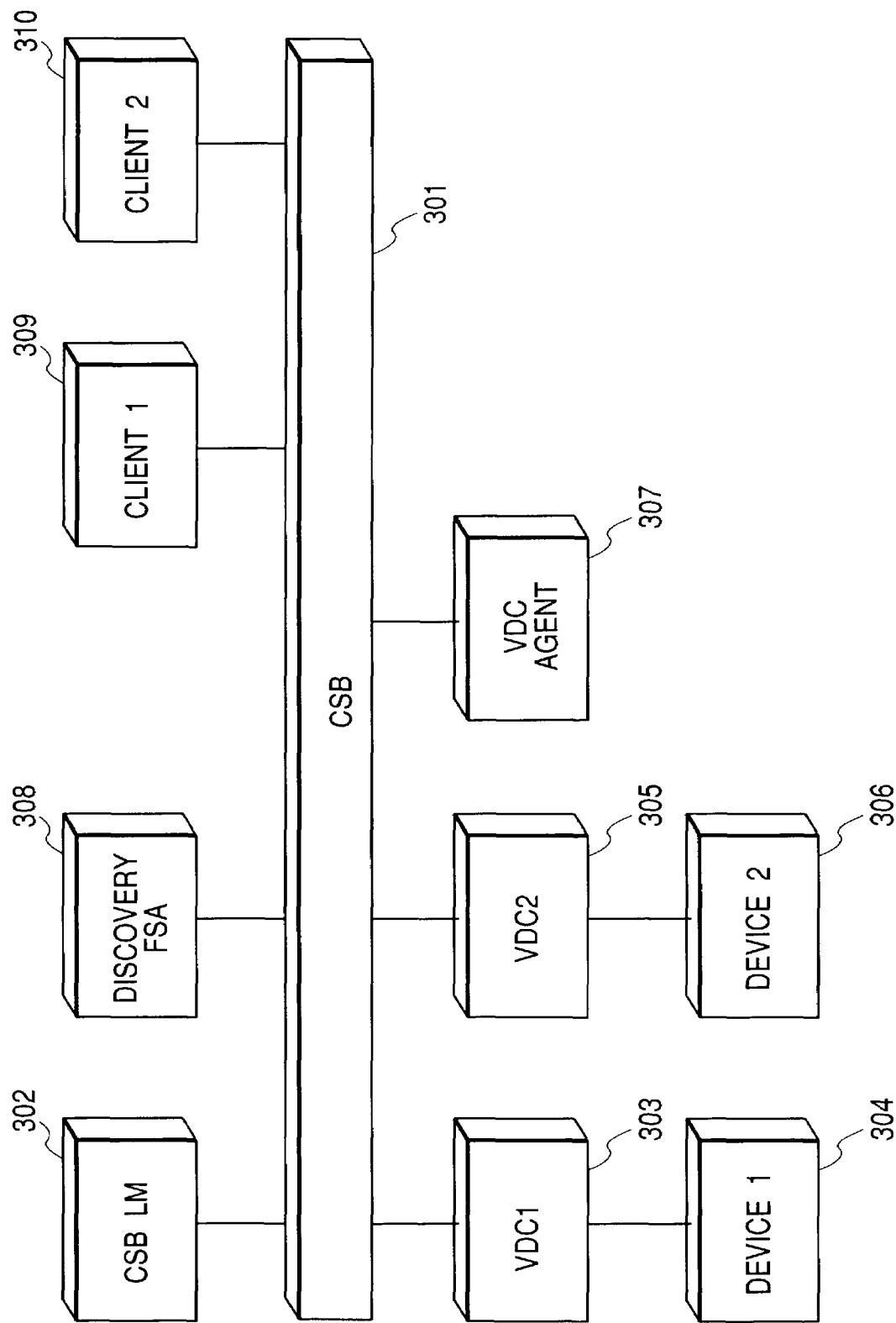
FIG. 4 is a diagram for explaining an arrangement construction of software components in the network system.

FIG. 4 is a diagram showing a construction of software components for network management.

All of software components 308, 309, 310, 303, 305, and 307 are activated by the PC, server, or the like shown in FIG. 1, respectively, and connected onto a logical software bus 301 called CSB.

A CSB-LM (302) provides a message distributing function between the software components connected to the CSB (301).

A VDC 1 (303) is a server software component which can operate in parallel on the terminal apparatuses existing in the distribution network environment and manages a device 1 (304). A VDC 2 (305) is likewise a server software component which can operate in parallel on the terminal apparatuses existing in the distribution network environment and manages a device 2 (306). The device 1 (304) and device 2 (306) correspond to the printers and the like shown in FIG. 1.

That is, in the embodiment, with respect to the device 1 (304), the VDC 1 (303) corresponding thereto is activated. With respect to the device 2 (306), the VDC 2 (305) corresponding thereto is activated. Thus, the data is independently handled every device and the load can be distributed.

A VDC-Agent (307) is a software component for managing the addresses of the terminal apparatuses (corresponding to the PCs and the like shown in FIG. 1) in which the processes of the VDC 1 (303) and the VDC 2 (305) are operating, interface pointers of the VDC 1 (303) and the VDC 2 (305), and basic information (information such as device names, addresses, and the like) of the devices which are managed by the VDC 1 (303) and the VDC 2 (305).

A Discovery-FSA (308) is a software component for searching a device.

A client software 1 (309) a the client software 2 (310) are software for using the foregoing various software components.

The VDC 1 (303) and the VDC 2 (305) correspond to "device information obtaining and setting means" and "device information obtaining and setting step". The VDC-Agent (307) corresponds to "device information obtaining, setting, and managing means" and "device information obtaining, setting, and managing step". The Discovery-FSA (308) corresponds to "device searching means" and "device searching step". The client software 1 (309) and the client software 2 (310) correspond to "user control receiving means" and "user control receiving step". The CSB (301) and the CSB-LM (302) correspond to "connecting means" and "connecting step".

For example, if the PC in which the client software 1 (309) has been installed wants to obtain the information of the device 1 (304), first, this PC transmits a CSB message to the CSB-LM (302) via the CSB (301) as a logical bus by the client software 1 (309), thereby obtaining a class ID of the Discovery-FSA (308) and the address of the terminal apparatus in which it is operating.

This PC obtains an interface pointer of the Discovery-FSA (308) on the basis of the obtained information by the client software 1 (309), thereby accessing the Discovery-FSA (308) and obtaining the device basic information (information such as device name, address, and the like) of the device 1 (304).

Subsequently, the PC in which the client software 1 (309) has been installed transmits the CSB message again to the CS-BLM (302) via the CSB (301) as a logical bus, thereby obtaining the class ID of the Discovery-FSA (308) and the address of the terminal apparatus in which it is operating.

This PC obtains the interface pointer of the Discovery-FSA (308) on the basis of the obtained information by the client software 1 (309), thereby accessing the Discovery-FSA (308). The PC obtains an interface pointer of the VDC 1 (303) which manages the device 1 (304) from the Discovery-FSA (308) by using the device basic information of the device 1 (304), thereby obtaining the information of the device 1 (304) from the VDC 1 (303).

Figure 5:
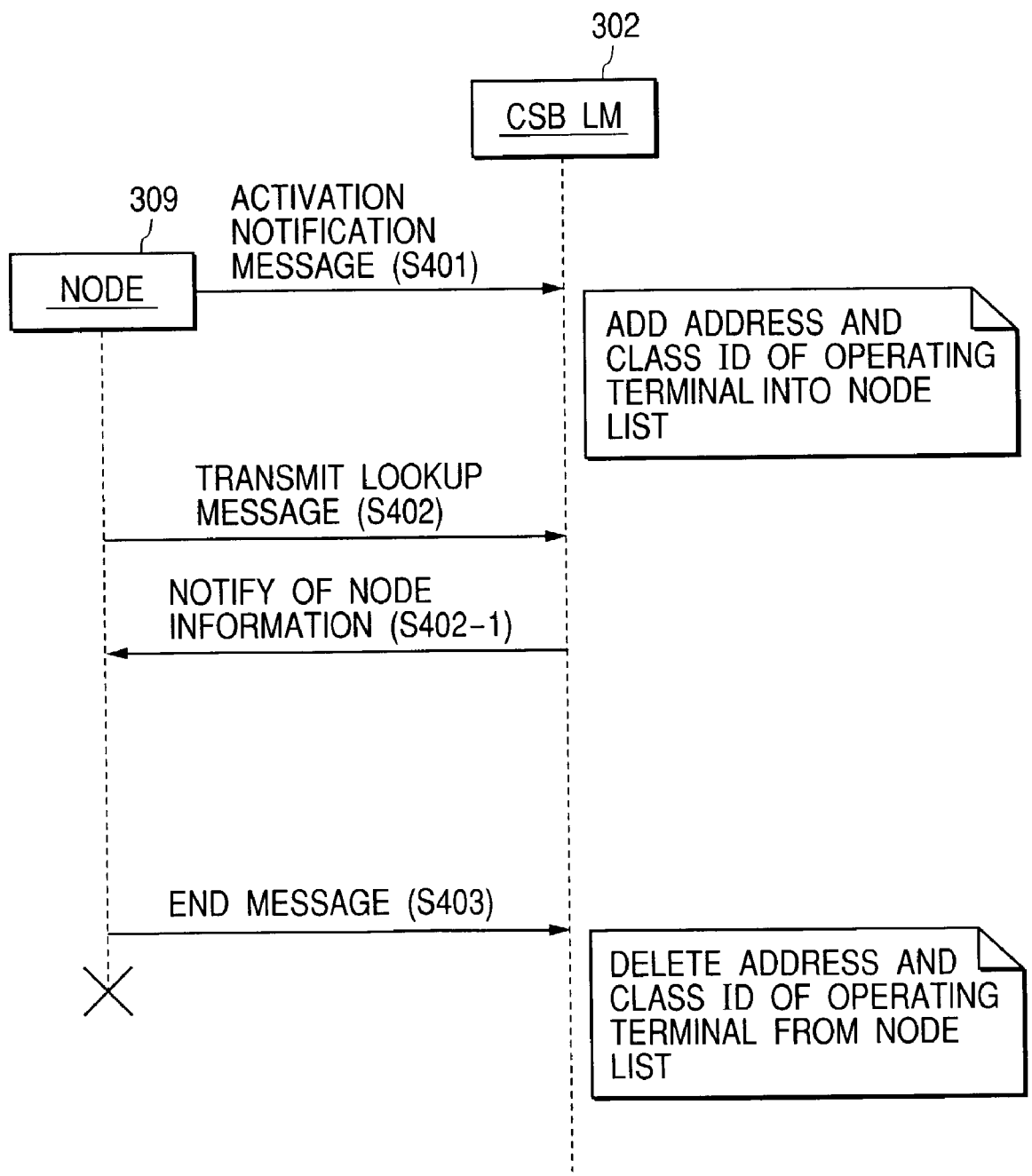
FIG. 5 is a diagram for explaining a relation between a CSB-LM and a node in the arrangement construction of the software components.

FIG. 5 shows the operation between an arbitrary software component (in this case, it is assumed to be the client software 1 (309) for simplicity of explanation: it is referred to as a "node 309" hereinbelow) among the various software components shown in FIG. 4 and the CSB-LM (302) shown in the diagram.

First, the node 309 transmits the CSB message indicative of the activation to the CSB-LM (302). The CSB-LM (302) adds the address of the terminal apparatus (corresponding to the PC or the like shown in FIG. 1) in which the newly activated node 309 is operating and a class ID of the node into a node list which is managed (step S401).

Subsequently, in order to obtain information of another node to be accessed from the CSB-LM (302) as necessary, the node 309 transmits a CSB-Look-Up message to the CSB-LM (302) (step S402).

The CSB-LM (302) which received it notifies the node 309 of the node information which is necessary for the node 309 (step S402-1).

The node 309 transmits the CSB message indicative of the completion of its own node to the CSB-LM (302) before the activation is finished (step S403).

Figure 6:
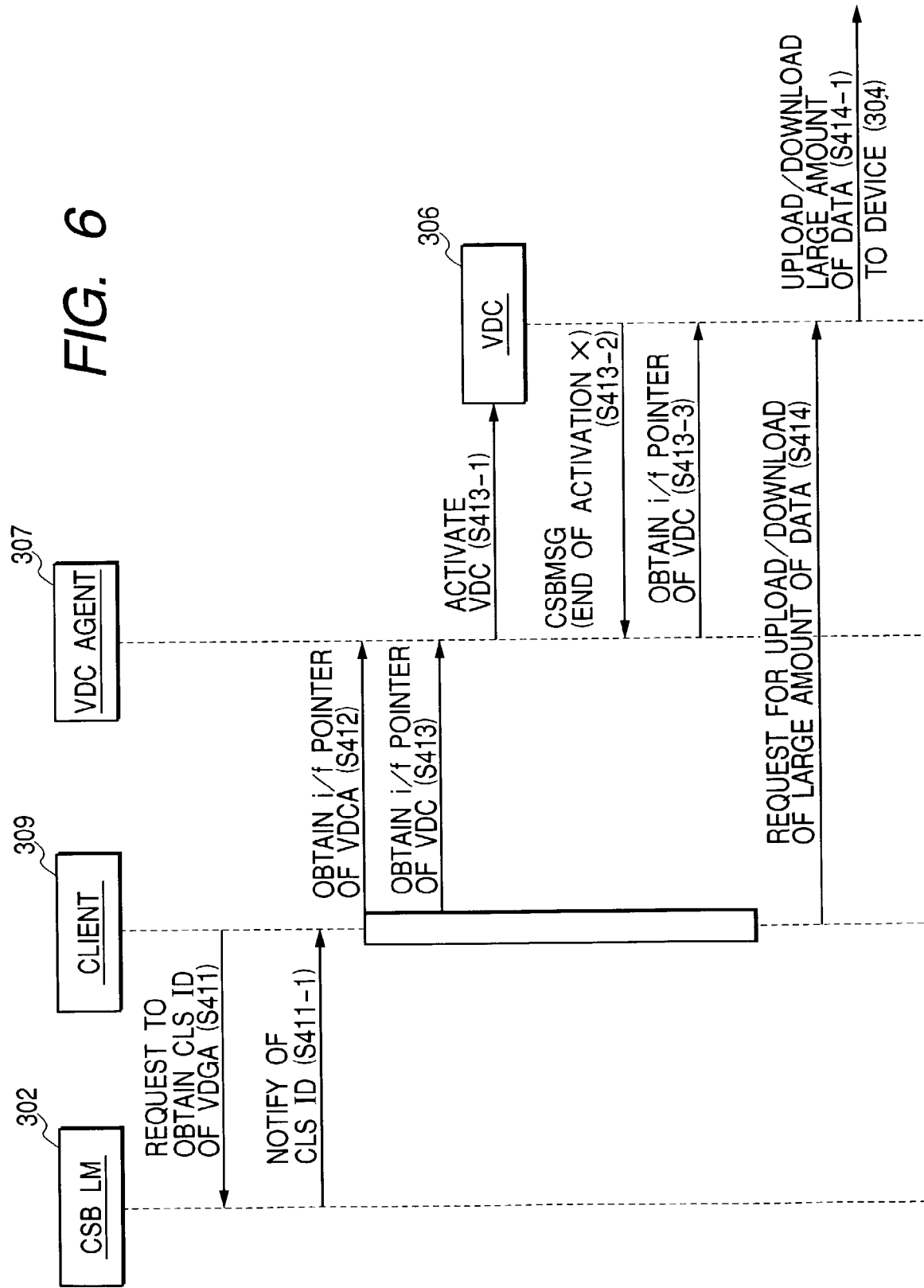
FIG. 6 is a diagram for explaining the accessing operation to a VDC in the arrangement construction of the software components.

FIG. 6 shows the operation in case of handling a large amount of data in the network system 100 having an arrangement construction of the various software components as shown in FIG. 4.

In the following description, it is assumed that the PC in which the client software 1 (309) is operating downloads or uploads the large amount of data into/from the device 1 (304) for the purpose of simplifying the explanation.

First, the client software 1 (309) requests a class ID of the VDC-Agent (307) and an address of the terminal apparatus in which it is operating from the CSB-LM (302) (step S411).

The CSB-LM (302) which received them notifies the client software 1 (309) of the class ID of the VDC-Agent (307) and the address of the terminal apparatus in which it is operating (step S411-1).

Subsequently, the client software 1 (309) obtains the interface pointer of the VDC-Agent (307) by using the information notified from the CSB-LM (302) in step S411-1 (step S412).

Subsequently, the client software 1 (309) requests the VDC-Agent (307) to obtain the interface pointer of the VDC 1 (303) which manages the device 1 (304) for downloading or uploading a large amount of data (step S413).

The VDC-Agent (307) which received it discriminates whether the VDC 1 (303) requested from the client software 1 (309) is in an activating state or not. If it is not the activating state, the VDC 1 (303) is activated (step S413-1).

In the activating state of the VDC 1 (303), when the CSB message indicative of the normal completion of the activation is received from the VDC 1 (303) (step S413-2), the VDC-Agent (307) obtains the interface pointer of the VDC 1 (303), holds it by itself, and returns it to the client software 1 (309) (step S413-3).

If the VDC 1 (303) has already been in the activating state, the VDC-Agent (307) returns the interface pointer obtained and held upon activation of the VDC 1 (303) to the client software 1 (309).

The client software 1 (309) requests the VDC 1 (303) to upload or download a large amount of data from/to the device 1 (304) by using the interface pointer of the VDC 1 (303) returned from the VDC-Agent (307) in step S413-3 (step S414).

Thus, the VDC 1 (303) executes the operation for uploading or downloading a large amount of data from/to the device 1 (304) (step S414-1).

As a terminal apparatus which holds the large amount of data as a target of uploading or downloading, a terminal apparatus in which the client software 1 (309) operates, and a terminal apparatus in which the VDC (303) operates, any of the devices which can be accessed via the LANs 150, 120, and 110 shown in FIG. 1 can be applied. However, to reduce traffic of the data communication, for example, in the case of uploading the data, the inter-process communication of the large amount of data occurs between the client software 1 (309) and the VDC (303). Therefore, if the terminal apparatus in which the client software 1 (309) operates and the terminal apparatus in which the VDC (303) operates are constructed by the same terminal apparatus, it is efficient in terms of the network traffic or performance. In case of downloading the data, since communication of a large amount of data occurs between the terminal apparatus (file server 106 or 113 or the like shown in FIG. 1) which holds the large amount of data and the VDC (303). Therefore, if the terminal apparatus which holds the large amount of data and the terminal apparatus in which the VDC (303) operates are constructed by the same terminal apparatus, it is efficient in terms of the network traffic or performance.

As a large amount of data which is uploaded from the device 1 (304), for example, data such as print job held in the hard disk in the device 1 (304), image file, calibration data, etc. can be mentioned. As a large amount of data which is downloaded to the device 1 (304), for example, data such as font data or the like can be mentioned.

Figure 7:
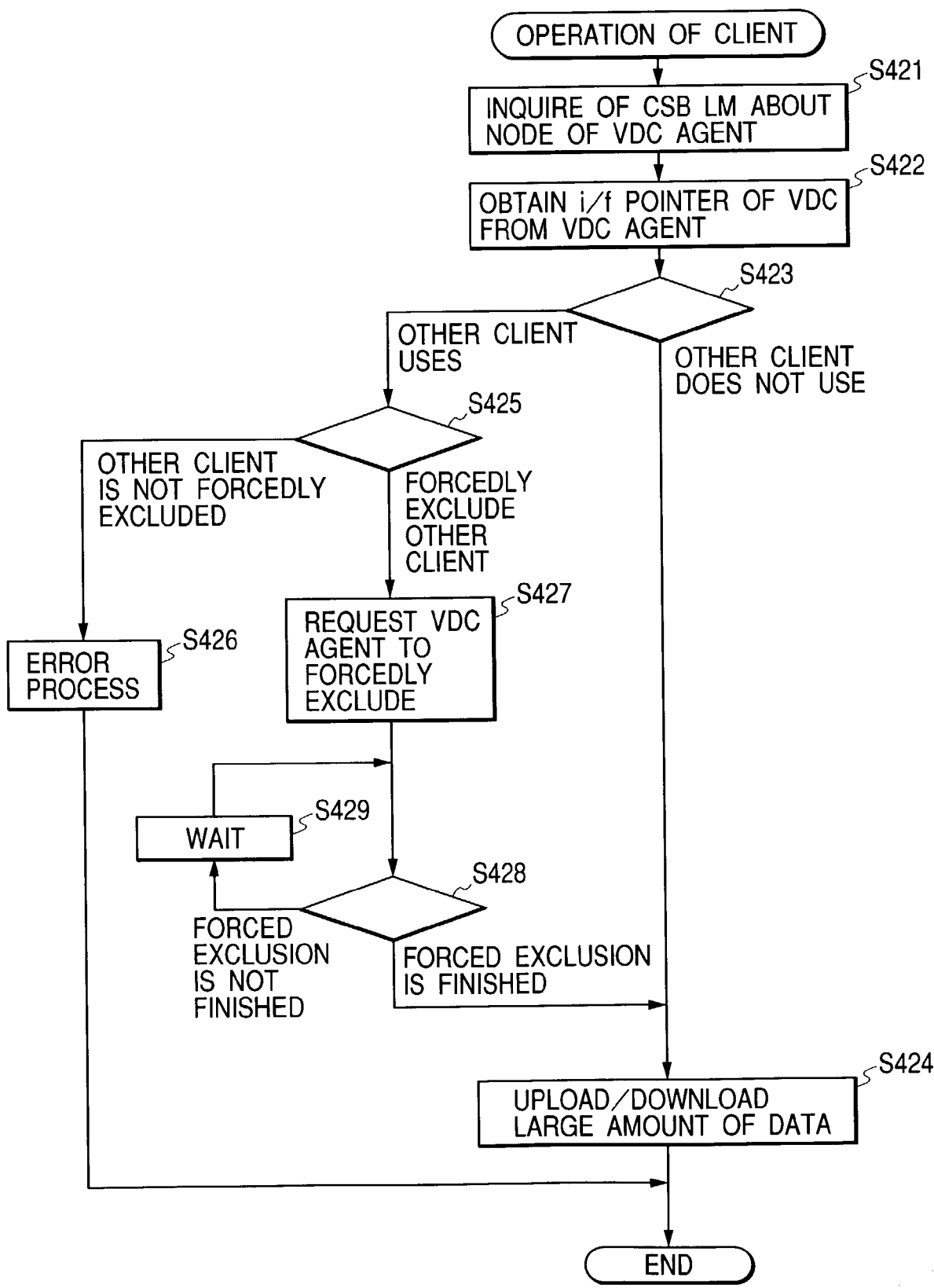
FIG. 7 is a flowchart for explaining the operation of the client in the accessing operation to the VDC.

FIG. 7 specifically shows the process of the client software 1 (309) in the operation shown in FIG. 6.

Step S421:

The CSB-LM (302) is inquired about the information (node information) such as class ID of the VDC-Agent (307), address of the terminal apparatus in which it is operating, and the like.

Step S422:

By accessing the VDC-Agent (307) on the basis of the node information returned from the CSB-LM (302) in response to the inquiry in step S421, an interface pointer of a VDC (target VDC) which manages the device from/to which the user wants to upload or download a large amount of data is obtained.

Step S423:

By accessing the target VDC on the basis of the interface pointer of the target VDC obtained in step S422, whether the target VDC is in a state where it is used by another client software or not is discriminated.

This discrimination is executed in order to determine whether the download of the large amount of data is executed as it is or not. This is because, for example, if the download of the large amount of data is executed, font data exists and, when the font data is downloaded, in the case where the resetting or the like of the device has been performed from the other client software, an erroneous operation occurs on the device side.

As a result of the discrimination of step S423, if the target VDC is in the state where it is used by the other client software, step S425 follows. If the target VDC is in the state where it is not used by the other client software, step S424 follows.

Step S424:

As a result of the discrimination of step S423, if the target VDC is in the state where it is not used by the other client software, the upload or download of the large amount of data is executed to the target VDC. The processing routine is finished.

Step S425:

As a result of the discrimination of step S423, if the target VDC is in the state where it is used by the other client software, whether the other client software is forcedly excluded or not is discriminated.

As a result of this discrimination, if the other client software is forcedly excluded, step S427 follows. If the other client software is not forcedly excluded, step S426 follows.

Step S426:

As a result of the discrimination of step S425, if the other client software is not forcedly excluded, an error process for notifying the user of the fact that the download or upload of the large amount of data cannot be executed is executed. The processing routine is finished.

Step S427:

As a result of the discrimination of step S425, if the other client software is forcedly excluded, the VDC-Agent (307) is requested to forcedly exclude the other client software.

Steps S428, S429:

Whether the forced exclusion of the other client software has been finished or not is confirmed by the notification from the VDC-Agent (307) responsive to the request in step S427 (step S428). If the forced exclusion is not finished yet as a result of the confirmation, the system enters a waiting mode for a predetermined time until the forced exclusion is finished (step S429). When the completion of the forced exclusion is confirmed, step S424 mentioned above follows and the upload or download of the large amount of data is executed.

Figure 8:
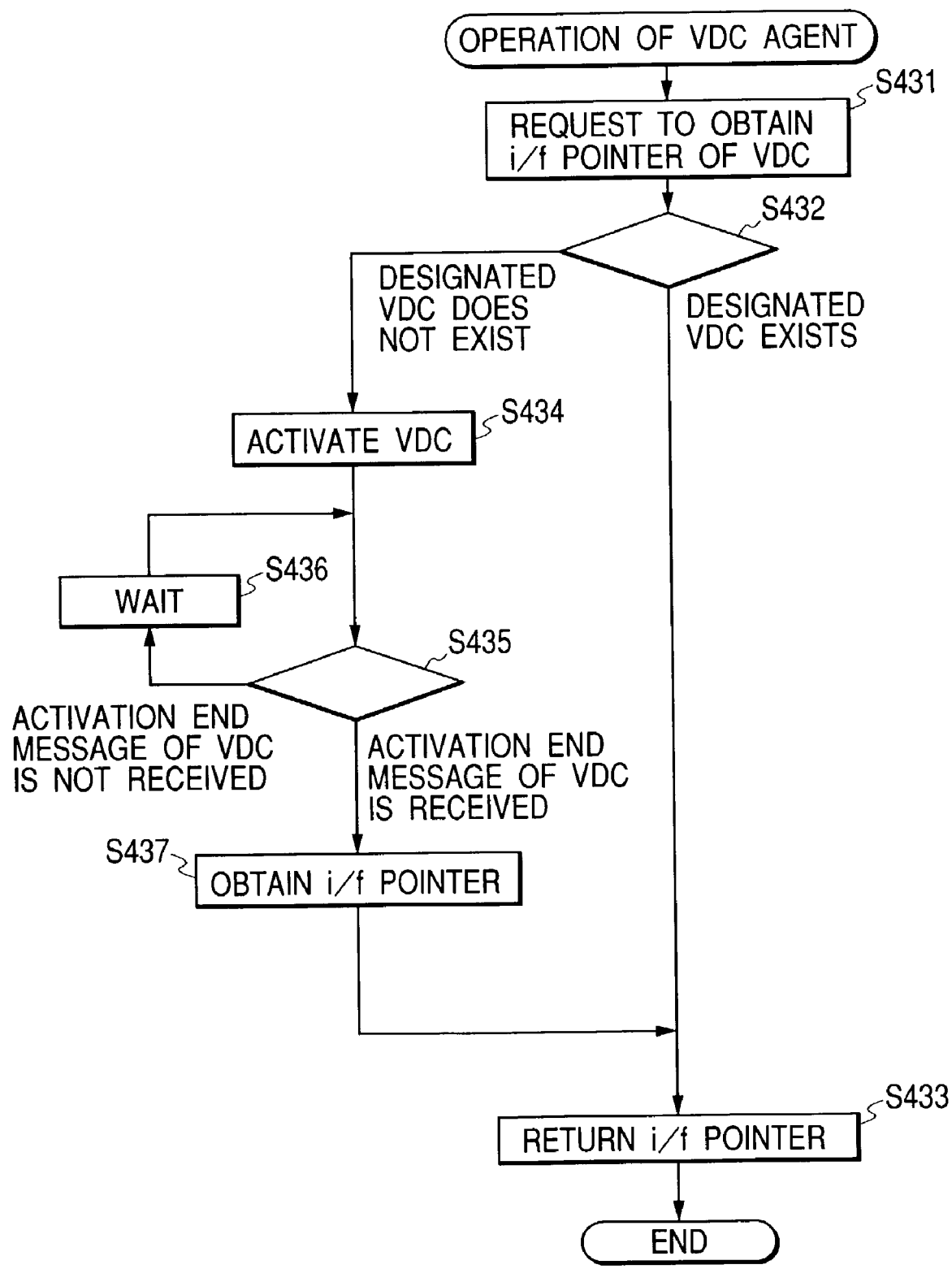
FIG. 8 is a flowchart for explaining the operation of a VDC Agent in the accessing operation to the VDC.

FIG. 8 specifically shows the process of the VDC-Agent (307) in the operation shown in FIG. 6.

Step S431:

A request for obtaining the interface pointer of the specific VDC (the VDC which manages the device which the client software 1 (309) wants to upload or download the large amount of data) is received from arbitrary client software (assumed to be the client software 1 (309) here).

Step S432:

Whether the specific VDC designated from the client software 1 (309) in step S431 is in a state where it has already been activated (state where it exists as a device in the activating state) or not is confirmed.

As a result of the confirmation, if the specific VDC is in the state where it has already been activated, step S433 follows. If the specific VDC is in a state where it is not activated yet, step S434 follows.

Step S433:

As a result of the confirmation in step S432, if the specific VDC is in the state where it has already been activated, the interface pointer obtained and held upon activation of the specific VDC is returned. The processing routine is finished.

Step S434:

As a result of the confirmation in step S432, if the specific VDC is not in the activating state, the specific VDC is activated.

Steps S435, S436:

Whether the CSB message indicative of the activation end (activation normal/error end) has been received from the specific VDC or not is confirmed (step S435). If the CSB message is not received yet, the system enters a waiting state for a predetermined time (step S436).

Step S437:

When the CSB message indicative of the activation end is received from the specific VDC, the interface pointer of the specific VDC is obtained from the CSB message. Step S433 follows and the interface pointer of the specific VDC is returned.

Figure 9:
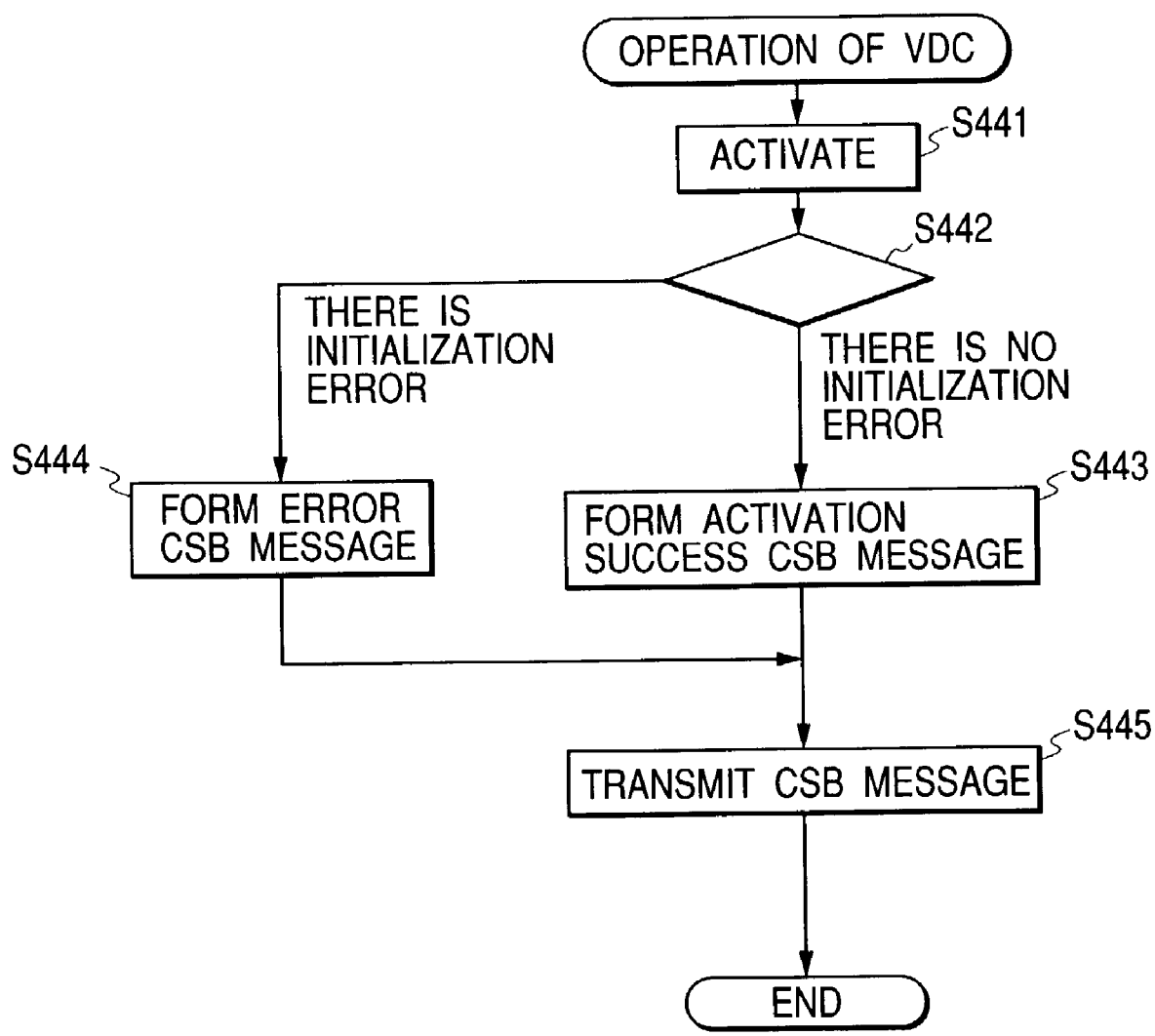
FIG. 9 is a flowchart for explaining the operation of the VDC in the accessing operation to the VDC.

FIG. 9 specifically shows the process of the VDC (303) in the operation shown in FIG. 6.

Steps S441, S442:

When the specific VDC is activated by the VDC-Agent (307) (step S441), whether an initializing process upon activation has normally been finished or not is discriminated (step S442).

As a result of the discrimination, if the initializing process has normally been finished, step S443 follows. If the initializing process is not normally finished, step S444 follows.

Step S443:

As a result of the discrimination in step S442, if the initializing process has normally been finished, a CSB message indicative of the activation normal end (success in activation) is formed, and step S445 follows.

Step S444:

As a result of the discrimination in step S442, if the initializing process is not normally finished, a CSB message indicative of an activation error is formed, and step S445 follows.

Step S445:

The CSB message formed in step S443 or S444 is returned to the VDC-Agent (307).

Naturally, the object of the invention is also accomplished by a method whereby a memory medium in which program codes of software for realizing the functions of the host and terminals in the embodiment have been stored is supplied to a system or an apparatus, a computer (or a CPU or an MPU) of the system or apparatus reads out and executes the program codes stored in the memory medium.

In this case, the program codes themselves read out from the memory medium realize the functions of the embodiment, and the memory medium in which the program codes have been stored and the program codes construct the invention.

As a memory medium for supplying the program codes, an ROM, a flexible disk, a hard disk, an optical disk, a magnetooptic disk, a CD-ROM, a CD-R, a magnetic tape, a nonvolatile memory card, or the like can be used.

Naturally, the invention incorporates not only a case where the computer executes the read-out program codes, so that the functions of the embodiment are realized but also a case where an OS or the like which is operating on the computer executes a part or all of actual processes on the basis of instructions of the program codes, and the functions of the embodiment are realized by those processes.

Further, naturally, the invention also incorporates a case where the program codes read out from the memory medium are written into a memory equipped for a function expanding board inserted into a computer or a function expanding unit connected to a computer and, thereafter, a CPU or the like provided for the function expanding board or the function expanding unit executes a part or all of the actual processes on the basis of instructions of the program codes, and the functions of the embodiment are realized by those processes.

According to the invention as described above, in the distribution network environment, the corresponding process is executed every plural devices. Thus, the data can be independently handled every device and the load can be distributed. Particularly, for example, the accesses (obtainment, setting, and the like of information) to the specific device which handles a large amount of data are integrated into one process, and the load can be distributed without influencing the communication performance on the management side of another device which does not handle the large amount of data.

In the case where, for example, the first client having means for receiving a control instruction from an outside (user or the like) executes a process for obtaining or setting information (download or upload of a large amount of data, or the like) into an arbitrary device, when the second client is in a state where it has already accessed the device, if the second client is forcedly excluded, a load of the data communication for obtaining or setting the information by the first client can be concentrated.

For instance, in case of uploading a large amount of data from the device, the inter-process communication of the large amount of data occurs between the means side which received such a control instruction (control receiving means side) and the device information obtaining and setting means. Therefore, the terminal apparatus or the system in which the control receiving means side is executed and the terminal apparatus or the system in which the device information obtaining and setting means is executed can be also constructed by the same apparatus. In this case, it is efficient in terms of the network traffic or performance.

For example, in case of downloading the large amount of data from the device, since the inter-process communication of the large amount of data occurs between the holding side of the large amount of data and the device information obtaining and setting means, the terminal apparatus or the system on the holding side of the large amount of data and the terminal apparatus or the system in which the device information obtaining and setting means is executed can be also constructed by the same apparatus. Also in this case, it is efficient in terms of the network traffic or performance.

What is claimed is:

1. A device control apparatus connected to a plurality of client apparatuses and a plurality of devices, the device control apparatus including a plurality of device control processes which respectively correspond to the plurality of devices, comprising:

a first receiving unit configured to receive a request from one of the plurality of the client apparatuses for access to a specified device control process from among the plurality of device control processes;

a judging unit configured to judge whether or not the specified device control process designated by said received request is in an activated state;

an activating unit configured to activate the specified device control process designated by said received request, in a case where said judging unit judges that the specified device control process is not in an activated state;

a second receiving unit configured to receive information to be used as a destination of data transmitted from the client apparatus, from the specified device control process activated by said activating unit;

a transmitting unit configured to transmit the information received by said second receiving unit to the client apparatus as a response to the request received by said first receiving unit;

a third receiving unit configured to in a case where the specified device control process designated by said received request is in use by another client apparatus different from said client apparatus that transmitted the request, receive a request from the client apparatus that transmitted the request for forcedly excluding said another client apparatus from using the specified device control process;

an exclusion unit configured to forcedly exclude said another client apparatus from using the specified device control process based on the request received by the third receiving unit; and a notifying unit configured to notify the client apparatus that transmitted the request that the forced exclusion of said another client apparatus has ended, in response to the request received by said third receiving unit, wherein the plurality of device control processes can be executed in parallel under respective controls of the plurality of different client apparatuses, and the specified device control process receives data which is transmitted from the client apparatus using the information transmitted by said transmitting unit, and downloads the received data to the device corresponding thereto.

2. A device control apparatus according to claim 1, further comprising:

a searching unit configured to search for the plurality of devices connected to the device control apparatus; and a holding unit configured to hold information of the devices searched for by said searching unit.

3. A device control apparatus according to claim 1, wherein, in a case where it is judged by said judging unit that the specified device control process is in an activated state, said transmitting unit transmits previously obtained information to be used as the destination of the data transmitted from the client apparatus.

4. A device control apparatus according to claim 1, wherein the information transmitted by said transmitting unit is an interface pointer of the specified device control process.

5. A device control method for a device control apparatus that is connected to a plurality of client apparatuses and a plurality of devices, the device control apparatus including a plurality of device control processes which respectively correspond to the plurality of devices, the device control method comprising:

a first receiving step of receiving a request from one of the plurality of client apparatuses for access to a specified device control process from among the plurality of device control processes;

a judging step of judging whether or not the specified device control process designated by said received request is in an activated state;

an activating step of activating the specified device control process designated by said received request, in a case where said judging step judges that the specified device control process is not in an activated state;

a second receiving step of receiving information to be used as a destination of data transmitted from the client apparatus, from the specified device control process activated by said activating step;

a transmitting step of transmitting the information received by said second receiving step to the client apparatus as a response to the request received by said first receiving step;

a third receiving step of, in a case where the specified device control process designated by said received request is in use by another client apparatus different from said client apparatus that transmitted the request, receiving a request from the client apparatus that transmitted the request for forcedly excluding said another client apparatus from using the specified device control process;

an exclusion step of forcedly excluding said another client apparatus from using the specified device control process based on the request received by the third receiving step; and a notifying step of notifying the client apparatus that transmitted the request that the forced exclusion of said another client apparatus has ended, in response to the request received by said third receiving step, wherein the plurality of device control processes can be executed in parallel under respective controls of the plurality of different client apparatuses, and the specified device control process receives data which is transmitted from the client apparatus using the information transmitted by said transmitting step, and downloads the received data to the device corresponding thereto.

6. A method according to claim 5, further comprising:

a searching step of searching for the plurality of devices connected to the device control apparatus; and a holding step of holding information of the devices searched for by said searching step.

7. A method according to claim 5, wherein, in a case where it is judged by said judging step that the specified device control process is in an activated state, said transmitting step transmits previously obtained information to be used as the destination of the data transmitted from the client apparatus.

8. A method according to claim 5, wherein the information transmitted by said transmitting step is an interface pointer of the specified device control process.

* * * * *